J. SAYER.
DISPLAY STAND FOR CHINAWARE, EARTHENWARE, GLASS, AND OTHER GOODS.
APPLICATION FILED FEB. 10, 1913.
1,180,544.
Patented Apr. 25, 1916.
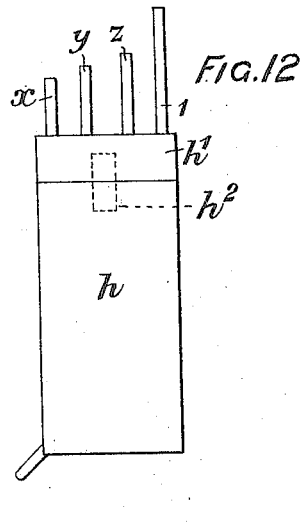
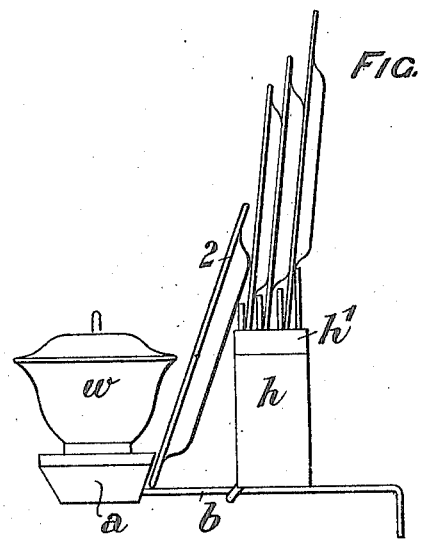
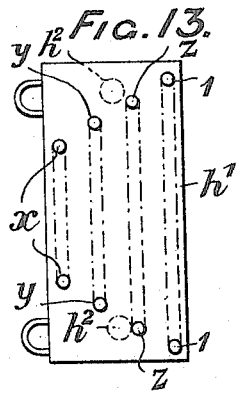
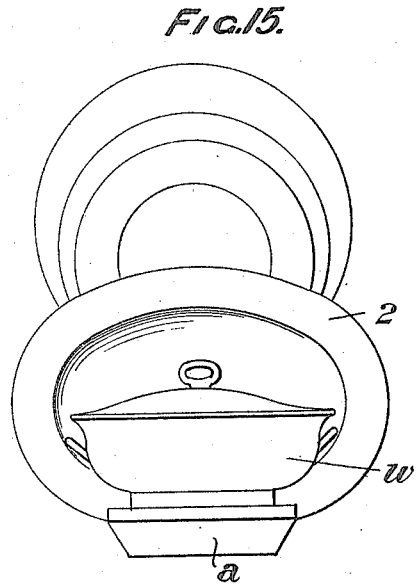
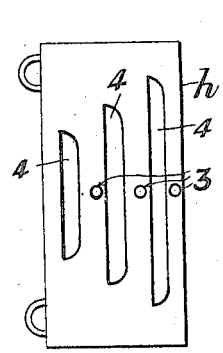

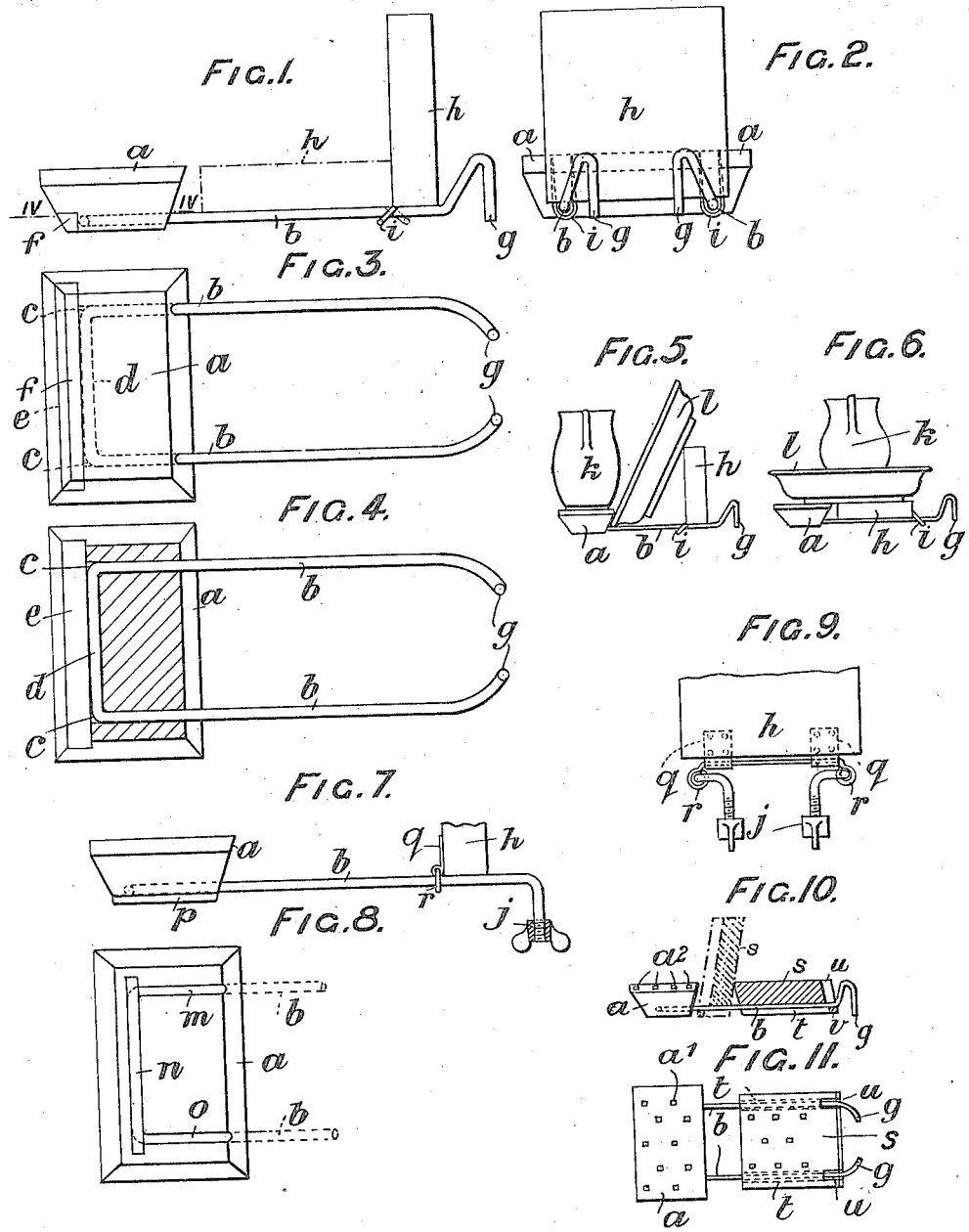

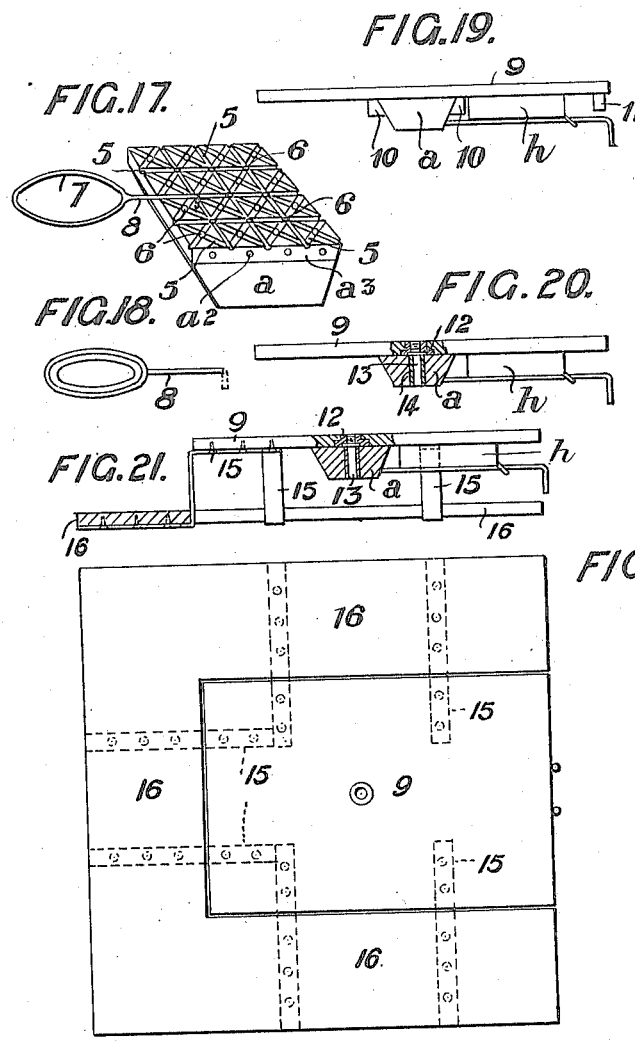

J. SAYER.
DISPLAY STAND FOR CHINAWARE, EARTHENWARE, GLASS, AND OTHER GOODS.
APPLICATION FILED FEB. 10, 1913.
1,180,544.
Patented Apr. 25, 1916.
4 SHEETS—SHEET 4.
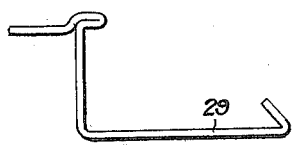
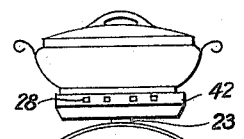
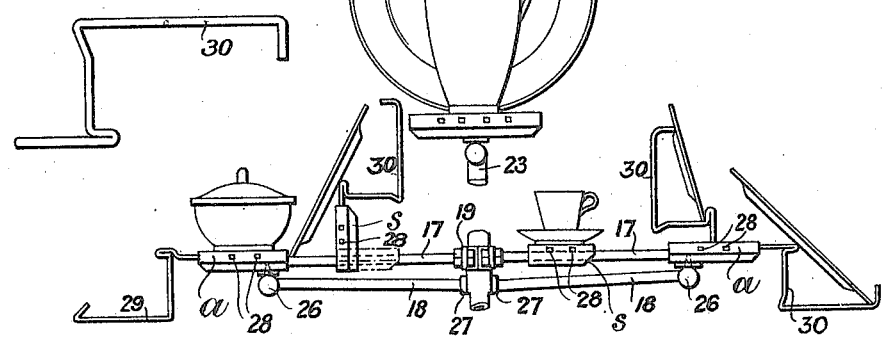
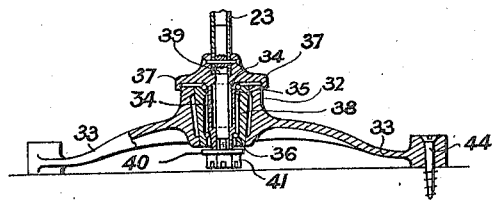
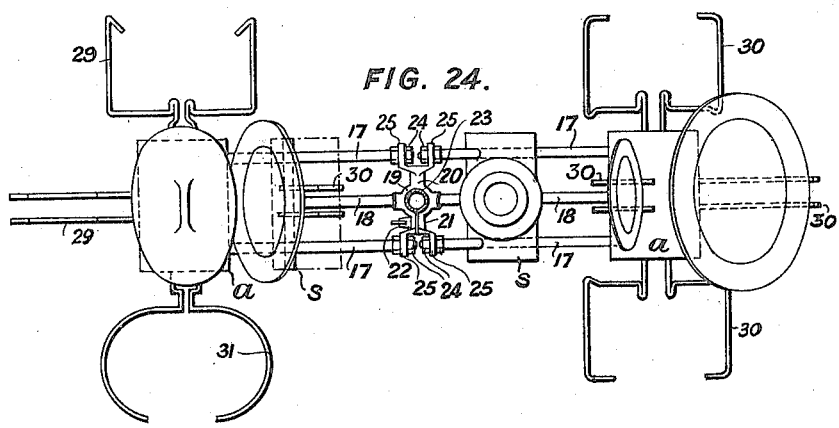

UNITED STATES PATENT OFFICE.

JOHN SAYER, OF EAST DULWICH, ENGLAND.

DISPLAY-STAND FOR CHINAWARE, EARTHENWARE, GLASS, AND OTHER GOODS.

1,180,544.

Specification of Letters Patent.

Patented Apr. 25, 1916.

Application filed February 10, 1913. Serial No. 747,424.

*To all whom it may concern:*

Be it known that I, JOHN SAYER, subject of the King of Great Britain, and residing at No. 214 The Rye, East Dulwich, in the county of Surrey, England, have invented new and useful Improvements in Display-Stands for Chinaware, Earthenware, Glass, and other Goods, of which the following is a specification.

This invention relates to improvements in stands for displaying ewers and basins and other china ware, earthenware, glass and other goods or articles in shops and elsewhere.

According to this invention the stand comprises a platform and a frame or bracket consisting for example of two wires forming a framework and adapted to be supported in or fixed to a socket or sockets or eyes fixed or clamped to an object such as a wall, a pillar or the like, or to be stood on the ground or elsewhere and a supporting flap pivoted and adapted to slide on the said frame or bracket so as to either be used in a raised position as a rest to support a basin, plate or the like in a more or less upright position, or when folded down to form an extension of the platform or a supplementary platform to support, for instance, a basin or bowl or any other article with a wide base or more than one article, if convenient. If desired the supporting flap may be provided with series of depressions or projections or both at the end which is uppermost when in the raised position, said projections being arranged one behind the other for supporting a plate or other article or a number of plates or other articles, one behind the other and in either case the said article or articles will be supported in a more or less upright position. And instead of the depressions or projections being integral with the supporting flap they may be on a part which is capable of being detached from the supporting flap if desired. Moreover in order to permit of displaying a larger number of articles on the stand, it is, if desired provided with a removable table which may be provided with dovetailed or undercut battens which slide along and embrace the platform, or the table may be otherwise connected to the platform and the table may be flat or made in steps or with stages of different heights. Or instead of connecting the table to the platform it may be connected to the supporting flap in which case it will be adjustable to and fro on the frame or bracket. Or either the platform or the supporting flap or the table or all of these things or separate portions adapted to be attached to and detached from these things, may be provided with a number of holes into which are hooked or inserted detachable subsidiary supporting devices or stands such as wires or trays adapted to display cups and saucers or other articles.

Figure 1 of the accompanying drawings is a side elevation of a simple form of stand constructed according to this invention. Fig. 2 is an end view thereof. Fig. 3 is an inverted plan. Fig. 4 is an inverted plan section on the line IV—IV, Fig. 1. Fig. 5 is a side elevation to a smaller scale showing a basin and ewer displayed on the stand in one manner and Fig. 6 is a similar view showing a ewer and basin displayed on the stand in another manner. Fig. 7 is a side elevation of a modified construction of stand. Fig. 8 is an inverted plan thereof with a portion removed and Fig. 9 is an end view of the hinged and sliding supporting flap. Fig. 10 is a part sectional side elevation of yet another construction and Fig. 11 is a plan thereof. Fig. 12, Sheet 2, is a side elevation of a supporting flap provided with wires, pins or projections for supporting a number of plates, one behind the other and Fig. 13 is a plan thereof. Fig. 14 is a side elevation of a stand provided with a supporting flap such as shown in Figs. 10 and 11 but to a smaller scale and displaying part of a dinner service and Fig. 15 is a front view thereof. Fig. 16 is a plan of a supporting flap with a modified arrangement of pins or projections. Fig. 17 is a perspective view of a stand provided with a number of grooves and projections to take small hooked loops or trays for the display of small articles and Fig. 18 is a perspective view of one of the hooked trays. Fig. 19 is a side elevation of a stand provided with a removable table. Fig. 20 is a similar view of a stand provided with a modified form of table. Fig. 21 is a side elevation of a stand provided with yet another modification of table and Fig. 22 is a plan thereof. Fig. 23 is an elevation partly in section of a pillar on a foot and adapted to have adjustably clamped thereon a number of stands. Fig. 24 is a plan of the stand only. Figs. 25, 26 and 27 represent bent wires adapted to be used with these stands.

Referring to Figs. 1 to 6, it will be seen that the stand consists of a platform $a$ made of wood or other appropriate material provided with a frame or bracket $b$ consisting of a piece of stout wire having two parallel sides, bent rectangularly at $c$ $c$ (best seen in Fig. 4) and threaded through holes in the platform $a$ which latter is moreover recessed to take the bridge or cross piece $d$ and has a part cut out at $e$ (Figs. 3 and 4), which is filled by a piece $f$ of wood or other suitable material glued, nailed or otherwise fixed thereto, the outer contour of the said piece corresponding to the opposite side, ends and bottom of the platform. The ends of the wires forming the frame or bracket $b$ are bent inward toward each other, upward and then downward at right angles to the plane in which the parallel sides lie, to form hooks $g$ which are adapted to take into ordinary shop fittings such as sockets or eye brackets fixed or attached to a pillar or column in the shop window or to a wall, shelf or other object. Or the bracket may be made of two wires the ends of which are driven into the platform $a$ or the ends of these wires may be screw threaded. The supporting flap $h$ which suitably consists of a rectangular block of wood or other appropriate material is connected to the horizontal parallel members of the bracket $b$ by means of two staples $i$, Figs. 1, 2 and 5, driven into the block at an angle of 45°, more or less, so that the block may be stood in the erect position, as shown in Figs. 1, 2 and 5 or laid down in the folded and horizontal position as shown in dotted lines in Fig. 1. The angular position of the staples provides that no matter however heavy may be the article which leans against the supporting flap, the tipping tendency of such flap will lock the latter in position on the bracket and will prevent it from sliding along said bracket until the pressure is taken off. If desired the two sides of each of the staples may be inclined to each other so as to insure a wedging action between the staples and the wires forming the bracket to render slipping a practical impossibility, as long as there is any weight resting against the supporting flap, even if the device be subject to vibration such as obtains in streets where the traffic is heavy and obviously the staples or the wire frame may be roughened or covered with suitable material to increase friction or the bottom of the block $h$ may be so treated or provided. In Fig. 5, the ewer $k$ is shown standing on the platform $a$, the supporting flap $h$ is in the raised position and the rim of the basin $l$ rests on the wires $b$ and up against the chamfered side of the platform while the bottom of the basin rests against the supporting flap $h$. The platform is not necessarily chamfered but the chamfering somewhat lightens the appearance, reduces the amount of material used and the rear chamfer against which the basin rests affords a good bearing surface to the basin or other article resting against the rear surface of the platform. In Fig. 6, the supporting flap $h$ is folded down flush with the platform to form a supplementary platform and this gives sufficient area to support a large article like the basin $l$, while the ewer $k$ is stood in the basin.

As shown in Figs. 7 and 8 and particularly in Fig. 8 the bottom of the platform $a$ is alternatively provided with grooves $m$ $n$ and $o$ into which the bent wire bracket $b$ is laid and a piece $p$, Fig. 7, is nailed, screwed or glued to the platform thereby finishing off the latter and rigidly connecting the platform and the bracket or the bracket may be fixed to the platform by clips, staples or any other appropriate fastening.

In the construction shown in Figs. 7 and 9 the supporting flap $h$ is provided with clips $q$ nailed or screwed thereto to which is hinged a piece of wire $r$ having an eye at each end which eyes pass over and are adapted to slide along the two side members of the frame $b$. If desired the hooked ends of the wires forming the frame $b$ are screw threaded to take butterfly nuts $j$ to prevent the hooked ends from slipping out of the sockets of the shop fittings and more especially out of holes made for example in shelves used in shops, show rooms or the like. It is obvious that in addition to the advantage derived from the fact that the supporting flap $h$ may be used as a platform or as an extension of the platform $a$ when in the lowered or folded position, there is a further advantage residing in the fact that the supporting flap takes up less room when in the folded condition and therefore facilitates packing and transport.

The construction shown in Figs. 10 and 11 differs from those hereinbefore described in the method of connecting the frame to the platform, the supporting flap to the frame and the formation of the hooks of the latter. As will be seen the supporting flap $s$ is provided with a pair of slots or grooves $t$ $t$ extending from one end to near the other end and a short pair of slots $u$ $u$ extending from the top to near the bottom, the said grooves $u$ and $t$ joining near the end where the small corner portions $v$ $v$ of material are not cut away. In the position shown in full lines the tops of the slots or grooves $t$ rest on the wires $b$ and the small portions of material $v$ integral with the supporting flap and at the junction of the grooves $t$ and $u$ prevent the latter from being actually detached from the wires $b$. When the supporting flap is required to be used in the erect position, its left end is turned up to the right and the flap is slid along for example to the position shown in dotted lines that is to say the bottoms of the grooves $u$ rest on the wires $b$ and the corner portions $v$ form abutments to prevent the flap from toppling over, if pressure be applied to the flap tending to push it farther to the right. The hooked portions are preferably bent up and then down so that the bottoms of the hooks are in the same plane as the bottom of the supporting flap $s$ and platform $a$. The wires are separate, being sharpened or chisel shaped at the ends and driven into the block forming the platform after being threaded through the holes in the supporting flap or the wires may be provided with screw threads and may be tightly screwed into holes made in the platform to receive them. If desired, the upper part and sides of the platform may be furnished with a number of holes $a^1$ and $a^2$ adapted to take subsidiary stands such as described with reference to Figs. 17 and 18 or Figs. 25, 26 and 27 and the supporting flap may also be similarly provided with holes some of which are indicated by the letter $s^1$ for the same purpose.

Referring to Figs. 12 to 15 the supporting flap $h$ is provided on top with a number of subsidiary stands consisting of projections such as short pieces of wire or headless nails $x$ $x$, $y$ $y$, $z$ $z$ and 1 1, which, as best shown in Fig. 12, afford support to three plates, one behind the other. The two pairs of projections $x$ $x$ and $y$ $y$ being closest together and shorter than the others serve to support a small plate, a larger plate is inserted between those marked $y$ $y$ and $z$ $z$ and a still larger plate between those marked $z$ $z$ and 1 1. Or instead of employing two separate projections such as $x$ $x$, a single staple may be employed instead of each pair of such projections as indicated by chain lines Fig. 13. Or the projections may be made detachable if desired and consist of a single piece of wire for each hole or they may be made of one piece of bent wire having two or more shanks to rest in the holes in the support. Moreover if desired the subsidiary stands or projections $x$ $x$, $y$ $y$, $z$ $z$, and 1, 1, or the like may be mounted on a part $h^1$ which is detachable from the main body of the supporting flap $h$, the latter being suitably provided with two or more holes into which fit dowels $h^2$ fixed in the lower end of the detachable part $h^1$ as indicated in dotted lines in Figs. 12 and 13 or it is obvious that the parts $h$ and $h^1$ may be provided with correspondingly formed dovetail portions for connection and disconnection as required or any other suitable means of connection may be employed. The platform $a$ is shown in Figs. 14 and 15 supporting a vegetable dish $w$ and the lower edge of a dish 2 rests on the frame $b$ against the platform $a$ while the upper edge of the dish rests against the supporting flap $h$ which is shown vertical, but it may be made to slope backward slightly, if desired.

As shown in Fig. 16 instead of pairs of stands or projections such as $x$, $y$, $z$, 1, a single projection 3 may be used in each case and the lower edge of the plate rests in a groove 4, or if the grooves be deep and wide enough the projections 3 may be dispensed with.

Fig. 17 illustrates a platform $a$ provided with a number of grooves 5 arranged at 45° and 90°, that is, some cross each other at right angles and others are diagonal. At some or all of the intersections vertical holes 6 are provided for the insertion of a subsidiary stand or bracket of known form such as that marked 7, the shank 8 of which is adapted to lie in one or other of the grooves, while the end is bent down as shown in dotted lines and fits in one or other of the holes 6. Furthermore the sides may also be provided with holes $a^2$ as described with reference to Figs. 10 and 11 and the upper part $a^3$ of the platform may be removable in the same manner as described with reference to Fig. 12. The shape of the hooked part of the subsidiary stand just referred to is clearly shown in dotted lines in Fig. 18 which illustrates a known form of tray for hooking on to sockets such as are commonly used in shop windows, but the hooked part may be dispensed with, if the bracket be used to stick into holes such as $a^2$ Fig. 10 in the sides of the platform or the like, and the holes may be round holes as shown for wire of round section or of square or other appropriate section according to the section of wire employed.

Fig. 19 shows a table 9 resting on the platform $a$ and supporting flap $h$ and provided with battens 10, 10 which are provided with opposite sides sloping or undercut to engage with the dovetail shaped platform $a$ and there may be an additional batten or battens such as that marked 11 flush with the battens 10 10 so that the table stands level if used on a flat surface apart from the stand.

In Fig. 20 the table 9 has an internally screw threaded socket 12 fixed therein and the flanged removable stud 13 adapted to be screwed therein fits loosely into a hole in the platform $a$ or as shown into a metal liner 14 in a hole in the platform. Or as shown in Figs. 21 and 22 the table 9 is provided with bent iron brackets 15 on three sides to which is fixed a lower platform 16 extending around the table on three sides but at a lower level. It is obvious that if desired the supporting flap $h$ may also be adapted to have the table 9 connected thereto.

Referring to Figs. 23 and 24 the frame consists of two wires 17, and a strut 18 forming a frame work which is stiffer than if only two wires are employed. The ends of the wires 17 are fixed to the socket 19 having arms 20 and 21, of which the latter is split and provided with a screw threaded stud and a fly nut 22 by means of which the socket is clamped on to a pillar 23 at the desired height. The wires or rods 17 are screw threaded at one end and by nuts 24 24, they are fixed to the ears 25 at the ends of the arms 20 and 21. The other ends of the rods 17 are tightly fixed in holes at one side of the platform $a$ while the strut 18 is screwed at one end into a screw threaded hole in a boss 27 on the socket 19 while the other end suitably takes into a small bracket 26 having a flange with holes through which pass screws fixing it to the platform $a$. Or the bracket 26 may be dispensed with and the wire 18 may be formed with an eye through which passes a screw which is screwed into the platform $a$. The frames 17, 18 are suitably mounted in pairs on a bracket 19 as shown. The platform $a$ and the supporting flap $s$ which is similar to that described with reference to Figs. 10 and 11 are provided with holes 28 of polyhedral section (such as of triangular, square or hexagonal section), preferably lined with a metal lining of similar section internally, into which may be stuck bent wire subsidiary stands of a section to correspond to the interior of the linings, such subsidiary stands being marked 29 (Fig. 25) or 30 (Fig. 26) or 31 (Fig. 27) which particular subsidiary stands are shown made of wire square in section to correspond with the interior of the holes. The wires may be of the forms shown or bent into other suitable shapes and are either stuck into holes 28 on the top or in the sides or ends of the platform $a$ or supporting flap $s$. A pair of wires is generally used to form one subsidiary stand and Figs. 23 and 24 illustrate a few of the ways of using these subsidiary stands. It should also be noted that each pair of bent wires forming a subsidiary stand may be used in different positions to form stands for supporting plates or other goods in a more or less upright or horizontal manner, see for example the subsidiary stands 29 in Figs. 23 and 24 and in any case the wires are of such a section as, when inserted in the holes or liners, to be incapable of rotation and moreover as these subsidiary stands are made in halves they take up less room than if a piece of wire were bent to form a complete stand, they are less liable to be deformed when in use or kept in a box or elsewhere or when being inserted in their places for use as stands or when being removed therefrom particularly in the event of the end of one wire sticking in a hole more than another.

Fig. 23 shows the arrangement of a pillar 23 on which the stands are mounted. The stands may be clamped so as to radiate in any direction and the pillar is preferably revoluble in a base 32 having legs or feet 33 which are suitably fixed by screws 44 to the floor, the object in making the pillar revoluble being to allow of turning the whole thing around to display all the stands as required and obviously the pillar may be rotated by hand or continuously or intermittently by power. The lower end of the pillar is provided with a sleeve 34 with ball races for rows of balls 35 and 36 and a depending flange 37 which projects over a concentric sleeve 38 provided with complementary ball races for the balls 35, 36 which sleeve 38 is externally of a taper corresponding to a taper hole in the base 32. The sleeve 34 is threaded on the rod 23 and abuts against the shoulder 39 on the rod. The lower end of the rod is provided with a screw thread and a washer 40 of an external diameter greater than the internal diameter of the lower end of the sleeve 38 so that the inner sleeve 34 is held rigidly in place on the rod by the nut 41 and the sleeve 38 with the balls 35 and 36 are loosely held in position, the object in making the rod and its bearings removable from the base 32 being not only to facilitate storage and transport of the multiple stand but also to permit of the rod being detached in a show room when not required or when the place is to be decorated, cleaned or rearranged. The top of the rod may have a small table 42 on which goods may also be displayed and obviously this table may also be provided with holes 28 for the insertion of subsidiary stands such as described with reference to Figs. 25, 26 and 27.

What I claim as my invention, and desire to secure by Letters Patent is:—

1. A display stand comprising a platform, a horizontally extending frame comprising substantially parallel members fixed and rigidly secured to said platform in a lower plane than that of the platform, a supporting flap, a combined sliding and hinge connection between said flap and parallel members adapted to permit said flap to be erected at any point along said members at various distances from said platform and to be folded flat onto such members, and means to connect subsidiary stands to said platform.

2. A display stand comprising in combination a frame, means on said frame for attaching it to an object, a platform fixed to said frame, a supporting flap slidable on and pivoted to said frame and adapted to be adjusted to a horizontal position to form a supplementary platform and to an approximately vertical position to form a rest for articles to be displayed, said platform having a plurality of holes, and a plurality of bent wires forming subsidiary stands and adapted to be held in said holes, substantially as set forth.

3. A display stand comprising in combination a frame, means on said frame for attaching it to an object, a platform fixed to said frame and a supporting flap slidable on and pivoted to said frame and adapted to be adjusted to a horizontal position to form a supplementary platform and to an approximately vertical position to form a rest for articles to be displayed, said flap being provided with a plurality of holes for subsidiary supporting means, substantially as set forth.

4. A display stand comprising in combination, a frame, means on said frame for attaching it to an object, a platform fixed to said frame, a supporting flap slidable on and pivoted to said frame and adapted to be adjusted to a horizontal position to form a supplementary platform and to an approximately vertical position to form a rest for articles to be displayed, said platform and supporting flap having a plurality of holes, and a plurality of bent wires forming subsidiary stands and adapted to be held in said holes, substantially as set forth.

5. A display stand comprising in combination, a frame, means on said frame for attaching it to an object, a platform fixed to said frame, a supporting flap slidable on and pivoted to said frame and adapted to be adjusted to a horizontal position to form a supplementary platform and to an approximately vertical position to form a rest for articles to be displayed, said platform and supporting flap having a plurality of holes, and a plurality of bent wires forming subsidiary stands and adapted to be inserted in and removed from said holes, substantially as set forth.

6. A display stand comprising in combination, a frame having parallel side members, a platform fixed to one end of said frame, a socket at the other end of said frame for attaching the latter to a standard, a strut extending from said socket to said platform, and a supporting flap pivoted to and slidable on the side members of said frame in such a manner as to be capable of being adjusted to a horizontal position to form a supplementary platform and to an approximately vertical position to form a rest, substantially as set forth.

7. A multiple display stand, comprising in combination a pair of frames each fixed at one end to a common clamping socket for attaching said pair of frames to a standard, a platform fixed at the other end of each of said frames, and a supporting flap pivoted to and slidable on each of said frames in such a manner as to be capable of being adjusted to a horizontal position to form a supplementary platform and to an approximately vertical position to form a rest, substantially as set forth.

In testimony whereof I have signed my name to this specification in the presence of two subscribing witnesses.

JOHN SAYER.

Witnesses:
 W. MORBEY,
 O. J. WORTH.

Copies of this patent may be obtained for five cents each, by addressing the "Commissioner of Patents, Washington, D. C."